(12) United States Patent
Budde

(10) Patent No.: US 7,793,558 B2
(45) Date of Patent: Sep. 14, 2010

(54) MOTOR WITH ROTATIONAL AND LINEAR DRIVE WITH INTEGRATED AXIAL FORCE MEASUREMENT

(75) Inventor: Thomas Budde, Würzburg (DE)

(73) Assignee: Siemens Aktiengesellschaft, München (DE)

( * ) Notice: Subject to any disclaimer, the term of this patent is extended or adjusted under 35 U.S.C. 154(b) by 89 days.

(21) Appl. No.: 12/278,910

(22) PCT Filed: Jan. 15, 2007

(86) PCT No.: PCT/EP2007/050327

§ 371 (c)(1),
(2), (4) Date: Aug. 8, 2008

(87) PCT Pub. No.: WO2007/090710

PCT Pub. Date: Aug. 16, 2007

(65) Prior Publication Data

US 2009/0007698 A1   Jan. 8, 2009

(30) Foreign Application Priority Data

Feb. 9, 2006  (DE) .................. 10 2006 006 037

(51) Int. Cl.
*G01D 9/00* (2006.01)
(52) U.S. Cl. .............................................. 73/862.627
(58) Field of Classification Search ............ 73/760, 73/862.621–862.69
See application file for complete search history.

(56) References Cited

U.S. PATENT DOCUMENTS

| 4,290,316 | A  | * | 9/1981 | Noar et al. ................... 74/5.46 |
| 4,914,726 | A  | * | 4/1990 | Burke .......................... 318/646 |
| 5,704,250 | A  | * | 1/1998 | Black .......................... 74/89.3 |
| 6,051,896 | A  |   | 4/2000 | Koide |
| 6,679,121 | B2 | * | 1/2004 | Sonnichsen et al. ........... 73/660 |
| 7,080,565 | B2 | * | 7/2006 | Delair et al. ............. 73/862.325 |
| 7,205,737 | B1 | * | 4/2007 | Bilodeau ..................... 318/434 |

FOREIGN PATENT DOCUMENTS

| DE | 21 41 292 A1 | 2/1973 |
| DE | 100 28 066 C1 | 12/2001 |
| EP | 1 607 205 A1 | 12/2005 |
| JP | 60098839 A | 6/1985 |

OTHER PUBLICATIONS

Ip.com "Endanschläge in einem Rotationslinearantrieb", Jürgen Carstens, Jan. 9, 2004; IPCOM000030702D.

* cited by examiner

*Primary Examiner*—Max Noori
(74) *Attorney, Agent, or Firm*—Henry M. Feiereisen; Ursula B. Day

(57) ABSTRACT

The driving force produced by the linear drive on a motor with a rotational drive and with a linear drive can be registered in a quantified fashion by virtue of the fact that deformation of a motor element (top disc 22) which connects a rotor (30) of the linear drive to an output shaft (24) is measured. A corresponding signal can then be assigned to a measured value for the axial force, either on the basis of a known linear relationship or on the basis of standardization. Strain measuring gauges (DMS1 to DMS4) are used to measure the deformation.

7 Claims, 2 Drawing Sheets

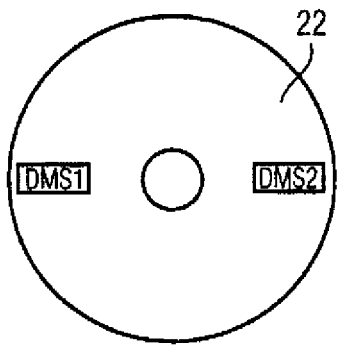
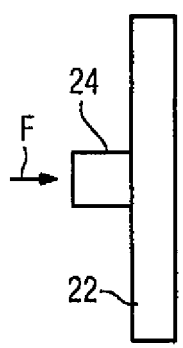
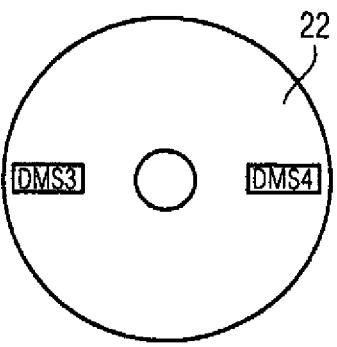
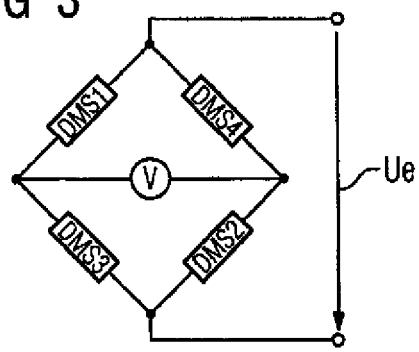
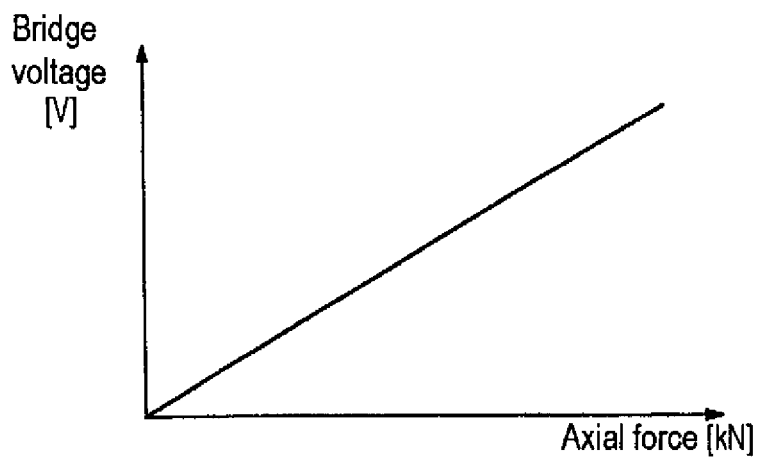

MOTOR WITH ROTATIONAL AND LINEAR DRIVE WITH INTEGRATED AXIAL FORCE MEASUREMENT

BACKGROUND OF THE INVENTION

The invention relates to a motor having a rotational drive which can cause an output drive shaft to move rotationally, and having a linear drive which can cause the output drive shaft to move translationally, with the linear drive having a rotor which is caused to move linearly with the aid of a stator and exerts an axial force on the output drive shaft via a motor element which connects the output drive shaft to the rotor.

Motors such as these, in which both a rotational and a linear drive are envisaged, are used for example for injector and metering units in plastic injection machines. In order to allow the injection pressure for the plasticized plastic to be controlled, information is required about the axial force exerted by the linear drive on the output drive shaft.

Until now, the approach has been adopted of determining the axial force on the basis of the stator current which is the cause of it. The motor current has therefore been measured and evaluated. However, the axial force can be determined only inaccurately, and in particular with errors, using this method. The determination process is inadequate when high axial force measurement accuracy is required.

SUMMARY OF THE INVENTION

The object of the invention is to improve a motor of the type mentioned initially such that the axial force can be measured more accurately.

This object is achieved by a motor having a rotational drive which can cause an output drive shaft to move rotationally, a linear drive which can cause the output drive shaft to move translationally, with the linear drive having a rotor which is caused to move linearly with the aid of a stator and exerts an axial force on the output drive shaft via a motor element which connects the output drive shaft to the rotor, a device for obtaining a measurement signal which is dependent on the deformation of the motor element, and a device for association of a measured value for the axial force with the measurement signals obtained.

According to the invention, the motor therefore has a device for obtaining a measurement signal which is dependent on the deformation of the motor element, as well as a device for association of a measured value for the axial force with the measurement signal obtained.

In other words, the deformation is measured, and this measurement is evaluated. The evaluation can be carried out using a conventional computation module. The axial force can be associated with the measured deformation on the basis of a previous calibration. By way of example, a value of the axial force can be emitted by the device for association via an appropriate indication apparatus, or can be supplied electronically to a control unit.

Cooling motors with a rotational and linear drive exist in several different forms. The normally preferred type is one in which the above motor element is a cup disk. The cup disk is connected at its center point to the output drive shaft. The rotor of the linear drive makes contact with the edge of the cup disk. Accordingly, it is normally cylindrical.

The device for obtaining the measurement signal preferably comprises at least one strain gauge. Strain gauges are electrical bodies with a resistance which can change when the body is compressed or expanded. If the strain gauge is firmly connected to the element to be measured, the deformation of the strain gauge models the deformation of the element to be measured, and this deformation can be determined on the basis of a resistance measurement. External voltage is normally used to pass a current through the strain gauge, and a voltage which represents the actual measurement signal is tapped off at a suitable point.

The use of strain gauges has the advantage that strain gauges are particularly space-saving. They are of simple design and can be handled easily.

In one preferred embodiment, the strain gauges are each arranged in pairs on a front face of the motor element and on a rear face. In the case of the cup disk, it is possible for the points on the front face and those on the rear face to be directly associated with one another, such that one strain gauge is arranged, so to speak, "behind" the other strain gauge. In other words, one would see only one strain gauge in a plan view of a transparent motor element, provided that the strain gauges are of the same size, because the other will be located precisely behind the first in the line of sight.

Two such strain gauge pairs are preferably used which are connected electrically to form a bridge arrangement. In this case, the two strain gauges in the pairs are each arranged in different parallel arms of the bridge. The measurement signal is then the bridge voltage, that is to say the voltage dropped between the parallel arms at the center of the bridge.

The bridge arrangement represents a particularly simple arrangement for evaluation of four and only four strain gauges, by which means two different points on the motor element/cup disk can be recorded, respectively on the front face and rear face.

BRIEF DESCRIPTION OF THE DRAWING

One preferred embodiment of the invention will be described in the following text with reference to the drawings, in which:

FIG. 2A shows a plan view of the cup disk associated with the motor shown in FIG. 1, with two strain gauges, FIG. 2B shows a side view of the cup disk with the shaft, in order to schematically illustrate the axial force, and FIG. 2C shows, schematically, a rear view of the cup disk with two further strain gauges, FIG. 3 shows the electrical circuitry of the strain gauges from FIG. 2A and FIG. 2C, in which the measurement signal can be obtained, and FIG. 4 shows a graph illustrating the relationship between the bridge voltage and the axial force.

DETAILED DESCRIPTION OF PREFERRED EMBODIMENTS

Figure 1:
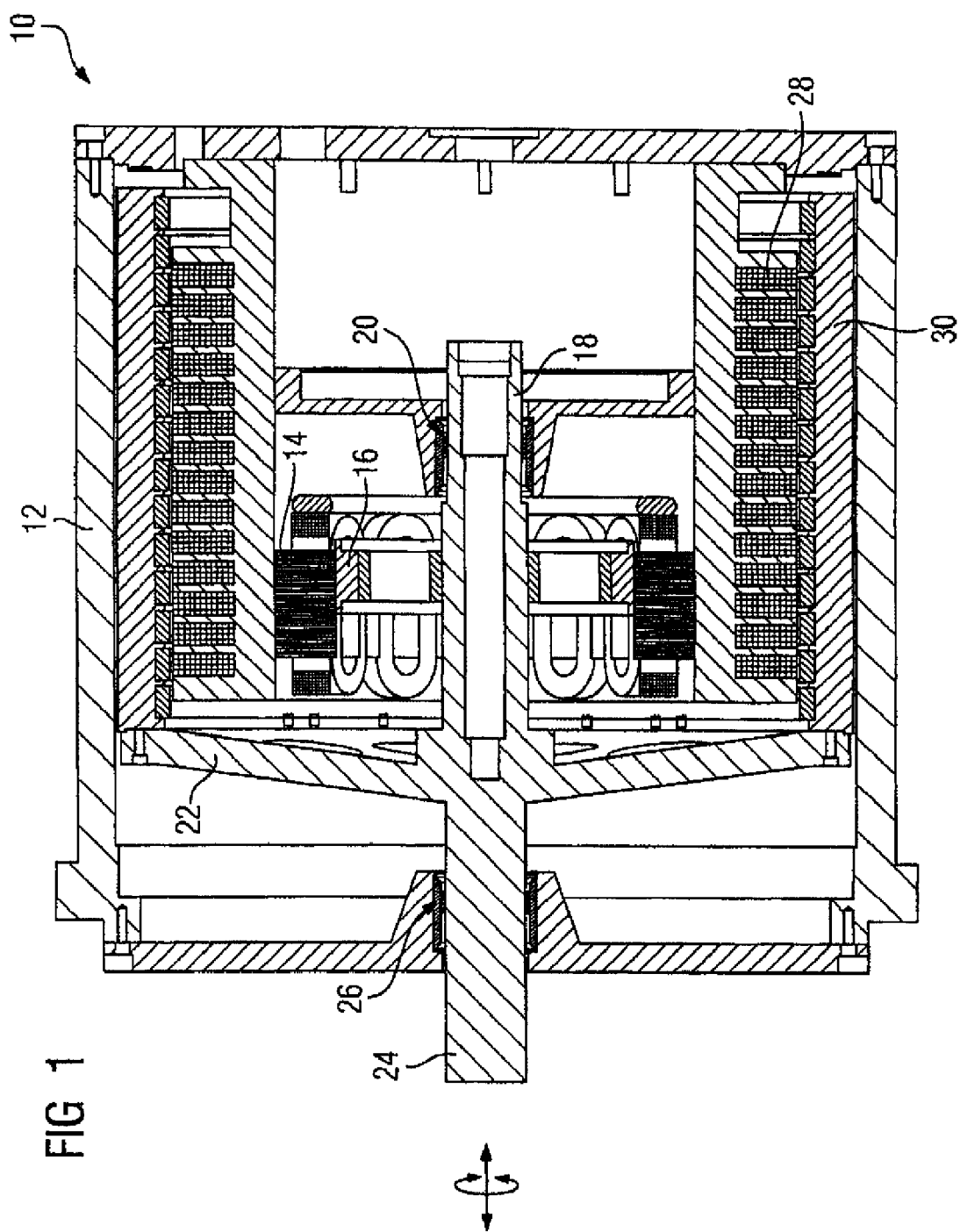
FIG. 1 shows, schematically, a cross section through a motor in which the invention can be implemented.

A motor which is annotated 10 in its entirety has a housing 12 in which both a rotational drive and a linear drive are arranged. Each drive comprises stators and rotors. The rotational drive comprises a stator 14 and a rotor 16 which rotates in the stator 14. The rotor 16 is connected to a shaft 18 which rotates in a bearing 20. The shaft 18 is fitted to a cup disk 22. An output drive shaft 24 is in turn fitted to the cup disk 22, as an extension to the shaft 18. The output drive shaft 24 therefore also rotates when the shaft 18 rotates. The output drive shaft 24 is mounted in a bearing 26. The bearings 20 and 26 allow both rotational movement of the respective shafts 18 and 24 as well as translational movement thereof. A translational movement is introduced via a linear drive. This includes a stator 28 and a rotor 30. The rotor 30 is connected to the cup disk 22 and is cylindrical. The cup disk 22 forms, so to speak, the base of a cup, and the rotor 30 its walls.

The motor 10 is a typical motor, as used in an injector and metering unit in a plastic injection machine. The aim in this case is now to control the injection pressure for the plasticized plastic. This requires information about the axially acting force (axial force) on the output drive shaft 24. In other words, it requires quantified information about the force which is produced by the stator 28 and the rotor 30 and results in translational movement.

In the present case, the system for determination of a quantified variable such as this is based on measurement of the deformation of the cup disk 22. Since the rotor 30 acts on the outer edge of the cup disk 22 and the output drive shaft 24 is fitted centrally to the cup disk 22, this results in lever effects and, associated with them, deformation of the cup disk 22, when axial forces are acting. The deformation can now be related to the axial force. Measurement of the deformation therefore makes it possible to produce a quantified statement relating to the axial force.

The deformation is now measured as follows:

As can be seen from FIGS. 2A and 2C, two strain gauges are provided on the front face of the cup disk 22, specifically a strain gauge DMS1 and a strain gauge DMS2, and extend radially over the cup disk 22. A strain gauge DMS3 and a strain gauge DMS4 are provided at precisely the same points on the rear face of the cup disk 22. The strain gauge DMS4 is, so to speak, located "behind" the strain gauge DMS1, and the strain gauge DMS3 is, so to speak, located "behind" the strain gauge DMS2. Let us now consider the situation in which the disk is moved from the rest state, as is shown from the side in FIG. 2B, to a state in which it is curved. During this process, the center of the disk is moved in one direction, and the edge of the disk is moved in completely the opposite direction. During the process, the strain gauges DMS1 and DMS2 are, for example, compressed, while the strain gauges DMS3 and DMS4 are stretched.

Strain gauges change their resistance on compression or stretching. The fitting of the strain gauges on the front face and rear face as shown in FIG. 2A and FIG. 2C makes it possible to use a bridge circuit, as is shown in FIG. 3. In this case, the strain gauges which are each fitted at mutually corresponding points on the cup disk 22 are arranged in parallel arms of the bridge, that is to say DMS1 on the one hand and DMS4 on the other hand, as well as DMS3 on the one hand and DMS2 on the other hand. In this case, the strip which is in each case located on the same face is arranged in the respective other parallel arm in the lower part, that is to say DMS2 is located on the same face as DMS1 (upper left arm) and is arranged in the right arm in the lower part of the bridge circuit, while DMS3 is located on the same face as DMS4 and is arranged in the lower part in the left arm of the bridge circuit, while DMS4 is located in the right upper arm. An external voltage Ue is now applied to the illustrated bridge circuit. The strain gauges are connected as described above, such that a bridge voltage V which is not zero is dropped on deformation of the cup disk 22.

FIG. 4 shows a theoretical curve. This is based on the assumption that the deformation is linearly related to the axial force acting (measured in kilonewtons). The bridge voltage is itself linearly related to the deformation. This results in a linear relationship between the bridge voltage and the axial force, as is illustrated in FIG. 4.

In real motors, the relationship may differ from this linear relationship. A calibration is then preferably provided. The axial force can be measured at the same time as the deformation by force gauges, and the electrical voltage measured can thus be calibrated with respect to the force.

Since an axial force measured value is required for control purposes, measured values such as these can be evaluated electronically in appropriate devices in the motor, on the motor or in the vicinity of the motor. A formula which reflects the linear relationship shown in FIG. 4 or else a calibration table can be stored in a computation module (not shown), to which the measurement signal is likewise supplied. In other words, the computation module can associate a measured value for the axial force with the measurement signal obtained, and supply it to the control system and/or can also indicate this on a display, if this should be necessary.

The invention allows very precise determination of a measured value for the axial force. The means used for this purpose are not particularly complex. In particular, the strain gauges DMS1 to DMS4 can be fitted to the cup disk 22 without causing any significant disturbance. The bridge circuit illustrated in FIG. 3 is simple and not complex.

What is claimed is:

1. A motor, comprising:
   a rotational drive rotationally moving an output drive shaft;
   a linear drive translationally moving the output drive shaft and including a rotor;
   a motor element connecting the output shaft to the rotor, wherein the rotor exerts an axial force on the output drive shaft via the motor element;
   a first device for obtaining a measurement signal in response to a deformation of the motor element as a result of the axial force applied by the rotor upon the motor element, and
   a second device for associating a measured value for the axial force to the measurement signal.

2. The motor of claim 1, wherein the motor element is a cup disk.

3. The motor of claim 1, wherein the first device comprises at least one strain gauge.

4. The motor of claim 1, wherein the first device comprises a plurality of strain gauges which are arranged in pairs, with one pair of strain gauges arranged on a front face of the motor element and another pair of strain gauges arranged on a rear face of the motor element.

5. The motor of claim 4, wherein two pairs of strain gauges are connected electrically to form a bridge arrangement, wherein the two strain gauges of the pairs are each arranged in different parallel arms of the bridges, with a bridge voltage which is dropped between the parallel arms in a center of the bridge providing the measurement signal.

6. The motor of claim 1, for controlling an injection pressure of plastic in a plastic injection machine in response to the measured value for the axial force.

7. The motor of claim 4, wherein one strain gauge of the one pair of strain gauges is positioned on the front face of the motor element at a location in immediate opposition to one strain gauge of the other pair of strain gauges positioned on the rear face of the motor element.

\* \* \* \* \*